United States Patent
Van Ness, II et al.

(10) Patent No.: US 8,794,902 B1
(45) Date of Patent: Aug. 5, 2014

(54) SYSTEM AND METHOD TO IMPROVE THE EXHAUST PRESSURE ACROSS A RAM AIR TURBINE THROUGH SECONDARY FLOW MIXING

(76) Inventors: Daniel K. Van Ness, II, Rockledge, FL (US); Brian E. Tews, Melbourne, FL (US); Christian O. Rodriguez, Melbourne, FL (US)

(*) Notice: Subject to any disclaimer, the term of this patent is extended or adjusted under 35 U.S.C. 154(b) by 708 days.

(21) Appl. No.: 12/693,557

(22) Filed: Jan. 26, 2010

(51) Int. Cl.
*F01D 25/24* (2006.01)

(52) U.S. Cl.
USPC .............................. 415/1; 415/119; 415/227

(58) Field of Classification Search
USPC ......... 60/770; 415/119, 227; 416/236 R, 335; 239/265.11, 265.19
See application file for complete search history.

(56) References Cited

U.S. PATENT DOCUMENTS

| | | | |
|---|---|---|---|
| 2,828,609 A | 4/1958 | Ogilvie | |
| 3,068,646 A | 12/1962 | Fletcher | |
| 3,174,282 A * | 3/1965 | Harrison | 239/265.17 |
| 3,409,228 A | 11/1968 | Mehr | |
| 3,463,402 A | 8/1969 | Langston, Jr. | |
| 4,051,671 A | 10/1977 | Brewer | |
| 4,052,847 A * | 10/1977 | Rodgers et al. | 60/262 |
| 4,149,375 A | 4/1979 | Wynosky et al. | |
| 4,175,640 A | 11/1979 | Birch et al. | |
| 4,215,536 A | 8/1980 | Rudolph | |
| 4,227,370 A | 10/1980 | Kirker | |
| 4,422,524 A * | 12/1983 | Osborn | 181/215 |
| 4,477,040 A | 10/1984 | Karanik | |
| 4,487,017 A * | 12/1984 | Rodgers | 60/262 |
| 4,576,002 A * | 3/1986 | Mavrocostas | 60/262 |
| 4,586,873 A | 5/1986 | Lepretre et al. | |
| 4,592,201 A * | 6/1986 | Dusa et al. | 60/262 |
| 4,786,016 A * | 11/1988 | Presz et al. | 244/130 |
| 4,819,425 A | 4/1989 | Farquhar et al. | |
| 4,919,364 A | 4/1990 | John et al. | |
| 5,067,316 A | 11/1991 | Bonniot | |
| 5,222,359 A * | 6/1993 | Klees et al. | 60/204 |
| 5,372,006 A * | 12/1994 | Lair | 60/226.2 |
| 5,435,127 A | 7/1995 | Luffy et al. | |
| 5,442,905 A * | 8/1995 | Claeys et al. | 60/785 |
| 5,505,587 A | 4/1996 | Ghetzler | |
| 5,761,900 A | 6/1998 | Presz, Jr. | |
| 5,836,738 A | 11/1998 | Finney | |
| 5,924,632 A | 7/1999 | Seiner et al. | |
| 6,082,635 A | 7/2000 | Seiner et al. | |
| 6,270,309 B1 | 8/2001 | Ghetzler et al. | |
| 6,378,932 B1 | 4/2002 | Fasel et al. | |
| 6,419,448 B1 | 7/2002 | Owczarek | |
| 6,510,683 B1 | 1/2003 | Lowlor | |
| 6,606,854 B1 * | 8/2003 | Siefker et al. | 60/262 |
| 6,792,747 B2 | 9/2004 | Schierbaum | |
| 6,804,948 B2 * | 10/2004 | Oishi | 60/262 |
| 6,877,960 B1 | 4/2005 | Presz, Jr. et al. | |
| 7,114,323 B2 * | 10/2006 | Schlinker et al. | 60/204 |

(Continued)

OTHER PUBLICATIONS

Presz, Jr et al., Multi-Stage Mixer/Ejector Systems, Jul. 10, 2002, AIAA, p. 5.*

*Primary Examiner* — Edward Look
*Assistant Examiner* — William Grigos

(57) ABSTRACT

A secondary flow lobe mixer increases the total-to-static pressure ratio across a Ram Air Turbine (RAT) by developing a localized pressure drop near the discharge of the turbine rotor exhaust. This pressure drop allows for additional power generation for a given free-stream flight condition.

24 Claims, 6 Drawing Sheets

(56) References Cited

U.S. PATENT DOCUMENTS

| | | | |
|---|---|---|---|
| 7,207,521 B2 | 4/2007 | Atkey et al. | |
| 7,389,635 B2 * | 6/2008 | Anderson et al. | 60/204 |
| 7,536,864 B2 | 5/2009 | Wolfe et al. | |
| 7,543,452 B2 * | 6/2009 | Reba et al. | 60/770 |
| 7,631,483 B2 | 12/2009 | Mani et al. | |
| 7,687,927 B2 | 3/2010 | Shander et al. | |
| 7,810,335 B2 | 10/2010 | Dussillols et al. | |
| 7,837,142 B2 | 11/2010 | Chase et al. | |
| 7,887,287 B2 | 2/2011 | Yanagi et al. | |
| 7,975,465 B2 | 7/2011 | Morris et al. | |
| 7,976,269 B2 | 7/2011 | Presz, Jr. et al. | |
| 8,042,354 B1 * | 10/2011 | Dziorny et al. | 62/402 |
| 8,376,686 B2 | 2/2013 | Presz, Jr. et al. | |
| 2003/0145578 A1 * | 8/2003 | Oishi | 60/262 |
| 2005/0103931 A1 * | 5/2005 | Morris et al. | 244/58 |
| 2007/0163230 A1 * | 7/2007 | Dussillols et al. | 60/262 |
| 2008/0105487 A1 | 5/2008 | Loheac et al. | |
| 2008/0105488 A1 | 5/2008 | Dussillols et al. | |
| 2008/0175703 A1 | 7/2008 | Lugg | |
| 2008/0232957 A1 * | 9/2008 | Presz et al. | 415/191 |
| 2008/0315042 A1 | 12/2008 | Evulet et al. | |
| 2009/0263244 A1 | 10/2009 | Presz, Jr. et al. | |
| 2011/0062290 A1 | 3/2011 | Chase et al. | |

* cited by examiner

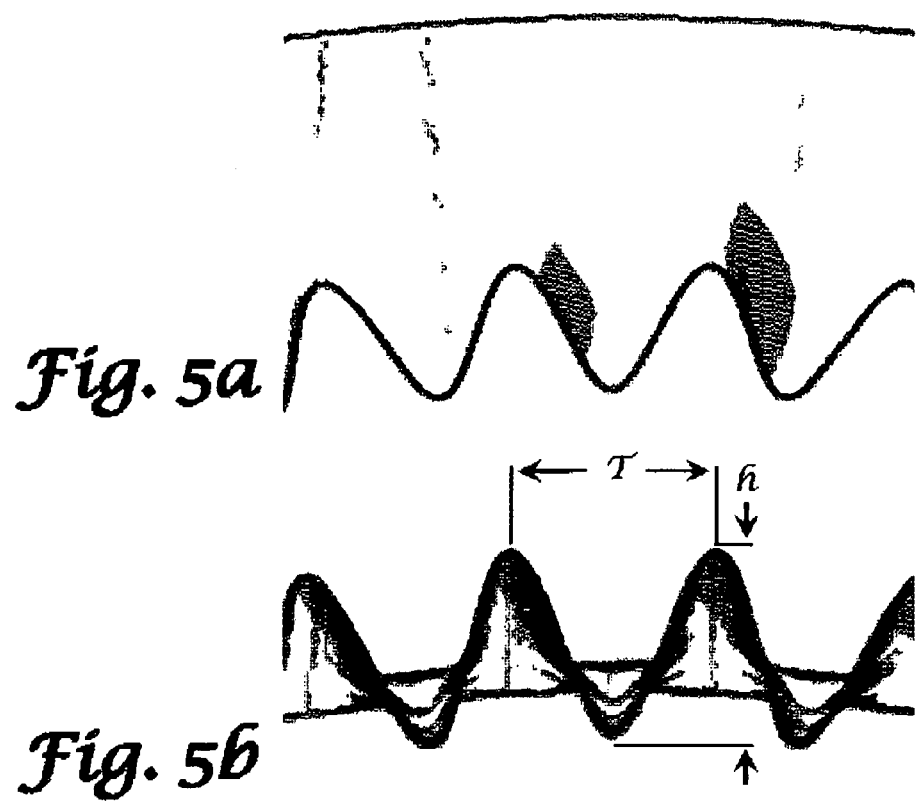

SYSTEM AND METHOD TO IMPROVE THE EXHAUST PRESSURE ACROSS A RAM AIR TURBINE THROUGH SECONDARY FLOW MIXING

GOVERNMENT LICENSE RIGHTS

The U.S. Government has a paid-up license in this invention and the right in limited circumstances to require the patent owner to license others on reasonable terms as may be provided for by the terms of Contract Number: N68335-06-C-0086, Contract Title: Development of a Compact Power Generation Turbine and Cooling System, Start Date: Dec. 5, 2005, End Date: Feb. 14, 2010, and Contract Number: N68335-09-C-0384, and Contract Title: Continued Development of a Compact Power Generation Turbine and Cooling System, Start Date: Aug. 5, 2009, End Date: Feb. 4, 2010, the entire disclosure of which are herein expressly incorporated by reference.

CROSS-REFERENCE TO RELATED APPLICATIONS

This application is related to U.S. application Ser. No. 12/333,770, now U.S. Pat. No. 8,192,158 issued Jun. 5, 2012; U.S. application Ser. No. 12/693,535, filed concurrently herewith; U.S. application Ser. No. 12/693,547, now U.S. Pat. No. 8,430,361 issued Jul. 9, 2013; and U.S. application Ser. No. 12/693,564, filed concurrently herewith.

BACKGROUND OF THE INVENTION

1. Field of the Invention

The present invention relates to air driven power generators, particularly to power generation, size, weight, and efficiency improvements of ram-air driven turbines. An aerodynamic secondary flow lobe mixer device mounted on the discharge side of an air-driven turbine has been developed. The invention generates an increased ratio of total-to-static pressure across a Ram Air Turbine (RAT) developed for a Prime Power Generating (PPG) unit, resulting in increased turbine power generation when compared to a RAT without the invention. Improvements in the ram-air turbine design and the functionality of the turbine exhaust ducting provide increased power extraction capability resulting in a smaller and lighter power generator that minimizes the overall system size and weight.

2. Description of the Related Art

A RAT is a turbine driven by free-stream air that flows past an aircraft during flight. RATs can be used to develop mechanical power that can be directly converted into electrical power using a generator, or both. The mechanical shaft power can be used to power any mechanical device, including but not limited to hydraulic systems, vapor-compression cooling system compressors, circulation pumps, or refueling pumps. Electrical power can be used for electronic subsystems, such as onboard avionics equipment, electronic warfare equipment, and auxiliary backup power systems. RATs can be mounted directly onboard an aircraft fuselage or on secondary wing mounted pods or stores. At wing-mounted locations, the RAT can be located either at an external location where the turbine is directly exposed to free-stream air, or an internal location inside a pod, where the free-stream air is ducted to the turbine through an inlet that is exposed to free-stream air. Prior work on internal RAT's have utilized ducts to deliver free-stream air to the turbine, by locating the RAT internally, pressure losses occur in the inlet ducting, which decreases turbine output power. They are also normally limited to ambient static pressure on the turbine discharge. The new invention makes it more feasible to locate a RAT in an interior location and extract additional power relative to a traditional RAT by lowering the turbine discharge pressure below atmospheric pressure.

U.S. Patent Application Publication No. 2009/0263244 A1 teaches the use of a mixer/ejector device that improves the performance of a water turbine through mixing of the turbine discharge and a secondary flow stream, increasing the turbine mass flow rate and overall energy extraction. This device is described as applying to ocean-, tidal-, and river/stream-currents.

U.S. Pat. No. 6,804,948 teaches the use of a lobe mixer for a jet engine that efficiently mixes two streams of gases by contouring of the lobes to reduce the noise normally generated while suppressing thrust losses caused by mixing.

U.S. Pat. No. 4,819,425 teaches the use of a lobe mixer with vent openings located within the lobe surfaces for noise suppression in a high bypass turbofan jet engine.

U.S. Patent Application Publication Nos. 2008/0105487 A1 and 2008/0105488 A1 both teach a curved lobe mixer for a bypass turbomachine comprising circumferentially distributed lobes that mix concentric gas streams within a converging-diverging flow nozzle to achieve noise suppression.

U.S. Pat. No. 4,149,375 teaches the use of a lobe mixer device with "scalloped" side walls that provide efficient mixing of two flow streams for improved noise suppression and/or engine performance with minimal pressure losses.

None of the above-mentioned prior art teaches the use of a lobe mixer device to mix two flow streams to augment the total-to-static pressure ratio across a ram air-driven turbine for the purpose of increasing power.

The mechanical power that can be developed from a RAT is a function of the total-to-static pressure ratio across the turbine rotor. The pressure at the face of the turbine rotor is a function of the aircraft velocity, altitude, and environmental conditions and is specified as the total pressure or the maximum obtainable pressure that can be utilized for power generation. If a method to decrease the static pressure at the turbine discharge is not utilized, the power generating capability of the RAT is limited to the total pressure developed by the aircraft and the ambient static pressure.

SUMMARY OF THE INVENTION

The present invention employing a lobe mixer relates to any air-driven turbine for producing shaft work and/or electric power generation. An axial turbine is used for demonstration purposes, although it will be apparent to anyone skilled in the art that the present invention also applies to radial, impulse, reaction, and other types of turbines.

Therefore, in light of the benefits of an enhanced ram-air turbine, the aforementioned shortcomings in the prior art, this invention has among other things, the following objectives:

To increase the total-to-static pressure ratio across a turbine resulting in increased power extraction, rotational speed, efficiency, and reduced size and weight.

BRIEF DESCRIPTION OF THE DRAWINGS

Other objects, advantages and novel features of the present invention will become apparent from the following detailed description when considered in conjunction with the accompanying drawings herein.

FIG. 5a is a perspective view of a sinusoidal-shaped lobe mixer, according to another embodiment of the innovation.

FIG. 5b is a rear view of the sinusoidal-shaped lobe mixer shown in FIG. 5a.

FIG. 6b is a rear view of the square-shaped lobe mixer, as shown in FIG. 6a.

DETAILED DESCRIPTION OF THE INVENTION

The present invention relates to air-driven turbine, power generation equipment. This invention is not limited to air but can be used with any incompressible or compressible working fluid. This invention is also not limited to aircraft, but may be used with automobiles, submarines, towed body arrays, hydroelectric dams, and other embodiments that may benefit from improved fluid energy extraction.

For systems requiring electrical power, the air-driven turbine and lobed mixer are designed as an integrated unit. The figures provided in the detailed description show an axial-flow turbine, although radial, impulse, reaction, and other types of turbines can be used as well. The following terms are defined to assist with the description of the invention as used the context of the present invention.

An air-driven turbine is a device that generates mechanical shaft power through the expansion of air or other working fluid through a turbine rotor.

An electric generator (or generator) is a generic term for a device that creates electrical power. In the context of the present invention, an electric generator is a machine comprised of the RAT and the alternator combined, with or without other devices attached to the power-producing shaft as well.

A lobe mixer is a device for lowering the pressure of a primary flow stream through the efficient mixing of a high velocity, low static pressure secondary air or other fluid flow with the primary lower velocity, higher static pressure flow stream. The lobe mixer achieves efficient mixing by creating cross-flow rotation of both fluid streams with respect to the other at each lobe, generating significant axial vorticity. The cross-flow rotation is achieved by appropriately shaping the mixer surface from an initially flat cross section to a highly contoured lobe shape which protrudes into and out of both flow streams, as would be known by anyone skilled in the art. The vorticity augmentation increases the level of mixing between the two flow streams over the traditional free shear layer mixing that would occur without a lobe mixer. Increased fluid mixing achieves a lower turbine discharge static pressure nearer to the turbine rotor exit plane than would occur otherwise. This lobe mixer concept is applicable to air, water, or other working fluids.

Figure 1:
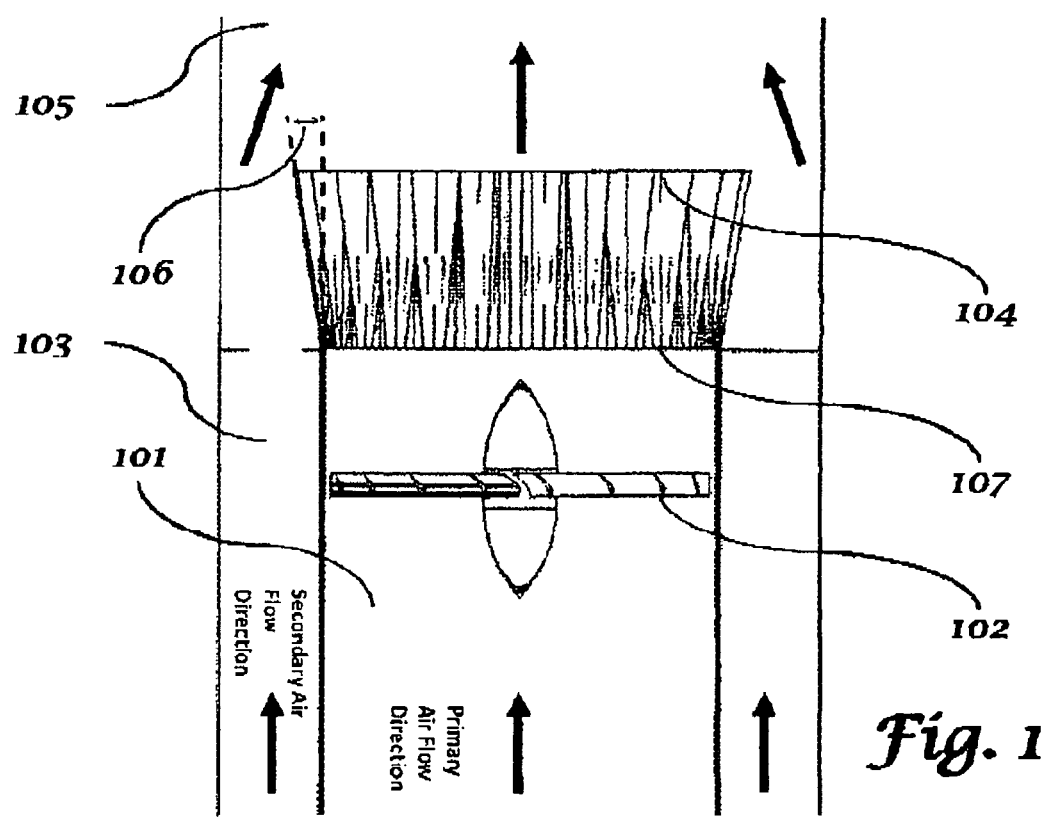
FIG. 1 is a side view of an internal air-driven turbine including a secondary flow lobe mixer in accordance with the present invention.

FIG. 1 is a side view of the primary flow duct 101 and internal air-driven turbine 102 including a secondary flow duct 103 incorporating the lobe mixer 104. The secondary flow duct 103 is located co-annularly around the primary flow duct 101 such that the secondary flow air discharges around the lobe mixer 104 and mixes efficiently with the primary air flow. The mixed flow stream exits downstream of the turbine in the turbine exhaust region 105. The secondary flow duct 103 is connected to the free-stream, thus capturing high total pressure fluid within. The primary flow duct 101 is also connected to the free-stream, to provide high total pressure fluid to rotate the air-driven turbine.

Figure 2:
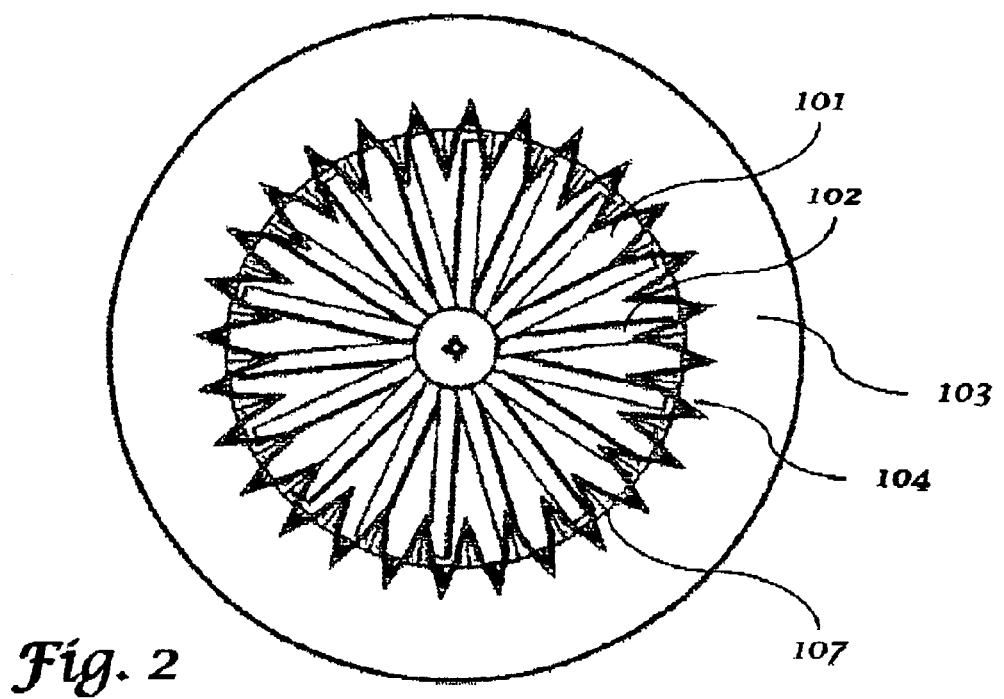
FIG. 2 is a rear view of the current embodiment of the turbine and secondary flow lobe mixer.

FIG. 2 is a front view of the secondary flow stream 103 surrounding the primary flow stream 101. This view also depicts the air-driven turbine 102, the lobe mixer 104 between the two flow streams and the lobe centerline 107 (also seen in FIG. 1) about which the lobe members can be symmetrically or asymmetrically arranged.

Figure 3:
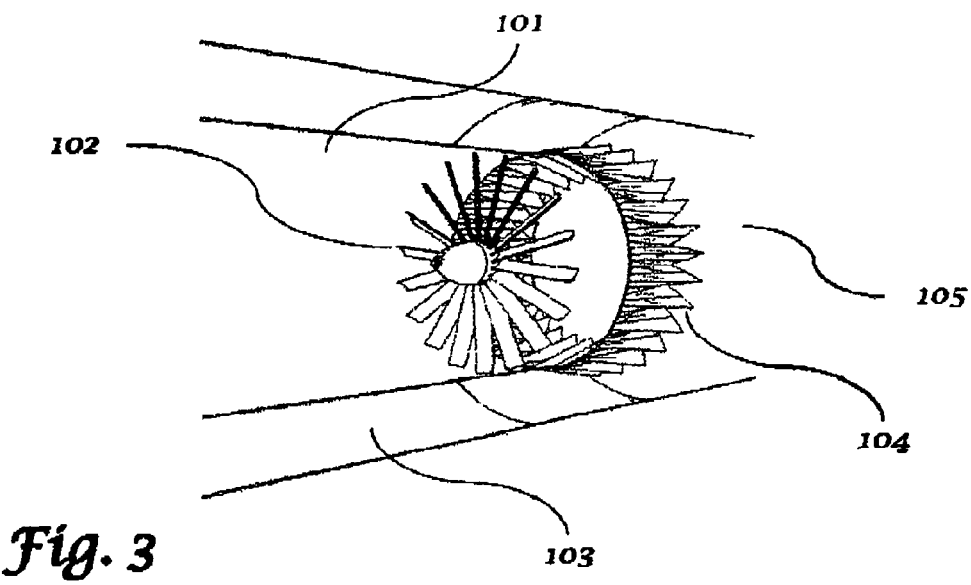
FIG. 3 is a perspective view of the air-driven turbine with the lobe mixer, according to the current embodiment.

FIG. 3 is a perspective view of the current embodiment showing a cutaway view of the upstream primary flow duct 101, air-driven turbine 102, and secondary flow duct 103. The full circumferential extent of the lobe mixer 104 is also shown downstream of the turbine discharge region. In this embodiment, the pitch and yaw angle orientation of the lobe mixer surface with respect to the axial flow direction may be varied in order to optimize the flow mixing into the turbine discharge section. The total number of mixer lobes and the overall mixer axial length may also be adjusted in order to improve the turbine discharge static pressure.

Figure 4A:
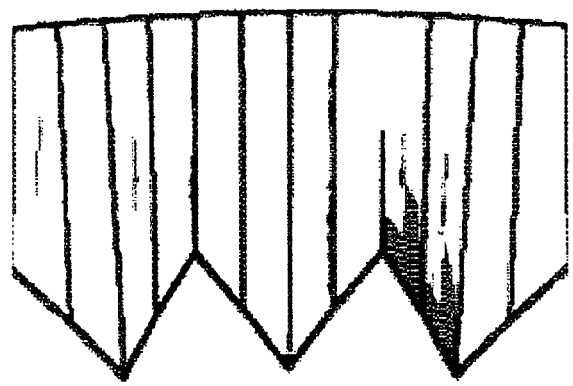
FIG. 4a is a perspective view of the triangle-shaped lobe mixer, according to a currently preferred embodiment.

FIG. 4a is a perspective view of the lobe mixer cross section shape. In the current embodiment, the cross-sectional shape is triangular; however, other embodiments with different shape configurations are also envisioned in this innovation, not limited to those presented herein.

Figure 4B:
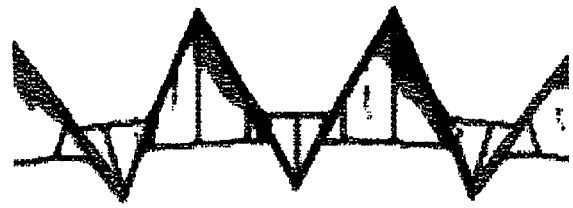
FIG. 4b is a rear view of the triangle-shaped lobe mixer, according to the currently preferred embodiment.

FIG. 4b is a rear view of the same triangularly-shaped lobe mixer as shown in FIG. 4a.

FIG. 5a depicts a perspective view of a lobe mixer with a sinusoidal lobe shape. Here, the lobe shape is symmetric with respect to the lobe centerline, although, asymmetric or other aperiodic lobe shapes are also envisioned.

FIG. 5b shows a rear view of the sinusoidal lobe mixer as embodied in FIG. 5a.

Figure 6A:
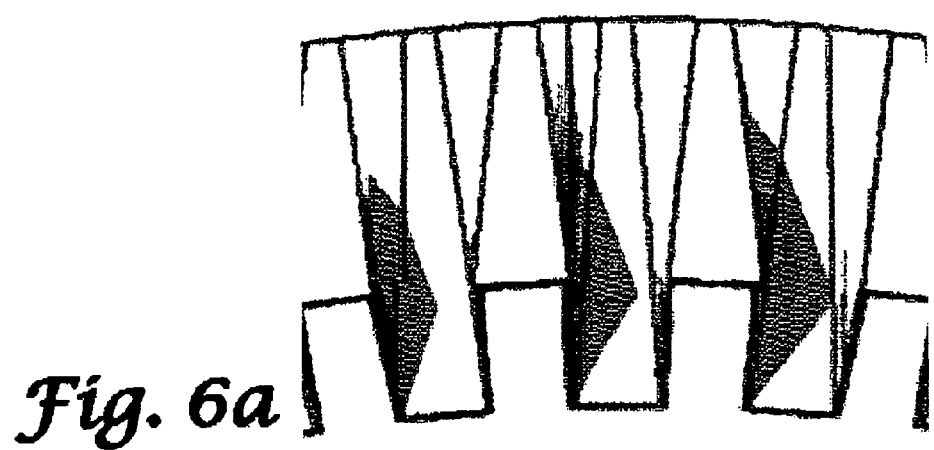
FIG. 6a is a perspective view of a square-shaped lobe mixer, according to yet another embodiment of the innovation.
Figure 6B:
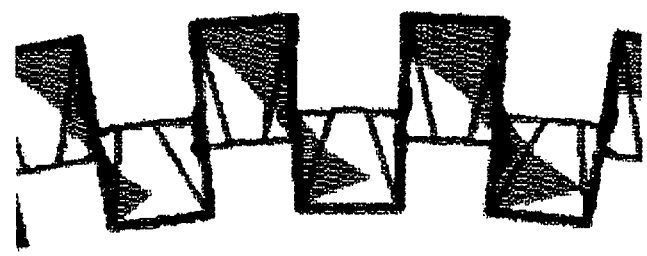

FIGS. 6a and 6b depict an isometric and rear view, respectively, of yet another lobe mixer shape conceptualized in this innovation. Here, the lobe mixer shape consists of a square lobe shape.

Referring to FIGS. 4a through 6b, the lobe mixers in each embodiment are constructed of lobe height (h) to lobe period (T) of one, as labeled in FIG. 5b. However, for each embodiment, the height of the lobes with respect to the lobe width may be altered in order to achieve optimal flow mixing. Also, the lobe location, number, pitch angle, yaw angle, and lobe periodicity are not restricted by the current embodiment; these may be varied in order to optimize the static pressure at the turbine discharge plane.

As shown in FIG. 1, the primary duct 101, secondary duct 103, and exhaust duct 105 are shown as straight ducts; however, these can be of varying cross sectional area as necessary for a given embodiment. These duct surfaces can be shaped to accommodate various profiles, such as a flat surface, arced surface, or other geometric shape to modify the conditions around the turbine rotor.

The location of the secondary flow ducting is not required to be circumferentially located 360 degrees around the co-annular primary flow duct. In another embodiment, the secondary flow ducting may only encompass a portion of the full circumferential extent around the primary flow ducting, such that the amount secondary air flow to the turbine discharge is sufficient to suitably lower the turbine exit static pressure below the unmodified discharge pressure. It is apparent to anyone skilled in the art, that any two separated primary and secondary flow passage geometries can be used where the goal is for the secondary passage to lower the static pressure of the primary passage.

Referring to FIG. 1, the angle between the axial flow direction and the mean lobe mixer surface 106 can be varied by increasing or decreasing the mean mixer trailing edge diameter, such that the lobe mixer protrudes more or less into the high velocity secondary air flow than the primary air flow. This angle may be adjusted accordingly in order to modify the performance of the system.

The present invention is not limited to Ram Air Turbines, but may be utilized on any other power generation system that can benefit with lower static pressures at the discharge point.

The current system may be utilized for mechanical shaft power generation to run hydraulic pumps, aircraft refueling pumps, aircraft refueling pods, cooling compressors, and cooling pumps and additional apparatuses that require mechanical or electrical power for operation. Additionally, the current system is not limited to mechanical shaft power generation. The shaft power may be suitably converted to electrical power through an accompanying alternator or other electricity generating device.

We claim:

1. A system for producing shaft work in a ram turbine associated with a moving vehicle, comprising:
a turbine stage associated with a primary air duct so as to be rotatable therein such that primary air introduced as a free stream into the primary air duct drives the turbine stag; a secondary air duct having an inlet arranged upstream of the rotatable turbine stage to admit secondary air introduced as a free stream into the secondary air duct; and a lobe mixer arrangement operatively mounted at the discharge end of the turbine and thus arranged relative to the secondary air duct such that the secondary air continuously discharges around the lobe mixer to generate a turbine discharge static pressure region which is lower than a static pressure that would exist without the lobe mixer arrangement and an increased total-to-static pressure ratio across the turbine is achieved without a change in total pressure between the inlet and the discharge end during movement of the vehicle.

2. The system of claim 1, wherein the turbine is one of axial turbine, a radial turbine, an impulse turbine and a reaction turbine.

3. The system of claim 1, wherein the lobe mixer arrangement is arranged in the secondary air duct which at least partially surrounds the primary air duct.

4. The system of claim 1, wherein a wall of the lobe mixer arrangement has at least one of a variable pitch and yaw angle orientation.

5. The system of claim 1, wherein the lobe mixer arrangement has lobe members of variable axial length.

6. The system of claim 1, wherein the lobe mixer arrangement has lobe members having one of a substantially triangular cross-section and sinusoidal cross-section.

7. The system of claim 1, wherein the lobe mixer arrangement has a lobe centerline with lobe members being symmetrically arranged with respect to the lobe centerline.

8. The system of claim 1, wherein the lobe mixer arrangement has a lobe centerline with lobe members being asymmetrically arranged with respect to the lobe centerline.

9. The system of claim 1, wherein the lobe mixer arrangement has lobe members configured with a square shape.

10. The system of claim 1, wherein the lobe mixer arrangement is configured with lobe members having a lobe height (h) substantially equal to a lobe period (T).

11. The system of claim 1, wherein the lobe mixer arrangement is configured with lobe members having a lobe height (h) different from the lobe period (T).

12. The system of claim 3, wherein the primary and secondary air ducts are straight ducts.

13. The system of claim 3, wherein the primary and secondary air ducts are of variable cross sectional shape.

14. The system of claim 1, wherein the lobe mixer arrangement is arranged to variably protrude into a high velocity secondary air flow so as to increase or decrease a mean trailing edge diameter of the lobe mixer arrangement.

15. A method for producing turbine shaft work in a ram turbine for a moving vehicle, comprising:
locating a secondary air duct at least partially coannularly with a primary air duct associated with and driving a rotatable turbine stage of the turbine such that an inlet of the secondary air duct is located upstream of the turbine stage;
arranging a lobe mixer downstream of the discharge end of the turbine such that a secondary air flow exiting the secondary air duct continuously discharges around the lobe mixer; and
moving the vehicle to cause a cross-rotation of the streams from both the primary and secondary air ducts at each lobe of the lobe mixer to increase total-to-static pressure ratio across the turbine without changing total pressure from the inlet to the discharge end.

16. The method of claim 15, wherein the turbine shaft work is used to generate electric power via an alternator integrally associated with a turbine shaft.

17. The method of claim 15, wherein a permanent magnet alternator is integrally associated with a shaft of the turbine.

18. The method of claim 15, wherein a hydraulic pump is integrally associated with a shaft of the turbine.

19. The method of claim 18, wherein the hydraulic pump is a fuel pump.

20. The method of claim 15, wherein a refrigeration compressor is integrally associated with a shaft of the turbine.

21. The method of claim 16, wherein a coolant pump is integrally associated with the shaft of the turbine.

22. The method of claim 15, wherein the shape, number and location of the lobes are selectively variable.

23. The method of claim 15, wherein pitch and yaw angle orientation of a surface of the lobe mixer are selectively variable.

24. The method of claim 15, wherein an angle between a direction of working fluid axial flow and a mean lobe mixer surface is selectively variable by an increase or decrease of a mean mixer trailing edge diameter.

* * * * *